Feb. 23, 1937. W. A. VAN DYKE 2,071,908
GRAIN AND SEED SEPARATOR
Filed July 22, 1935 3 Sheets-Sheet 1

Inventor
William A. Van Dyke
By Cline Hartson
Attorney

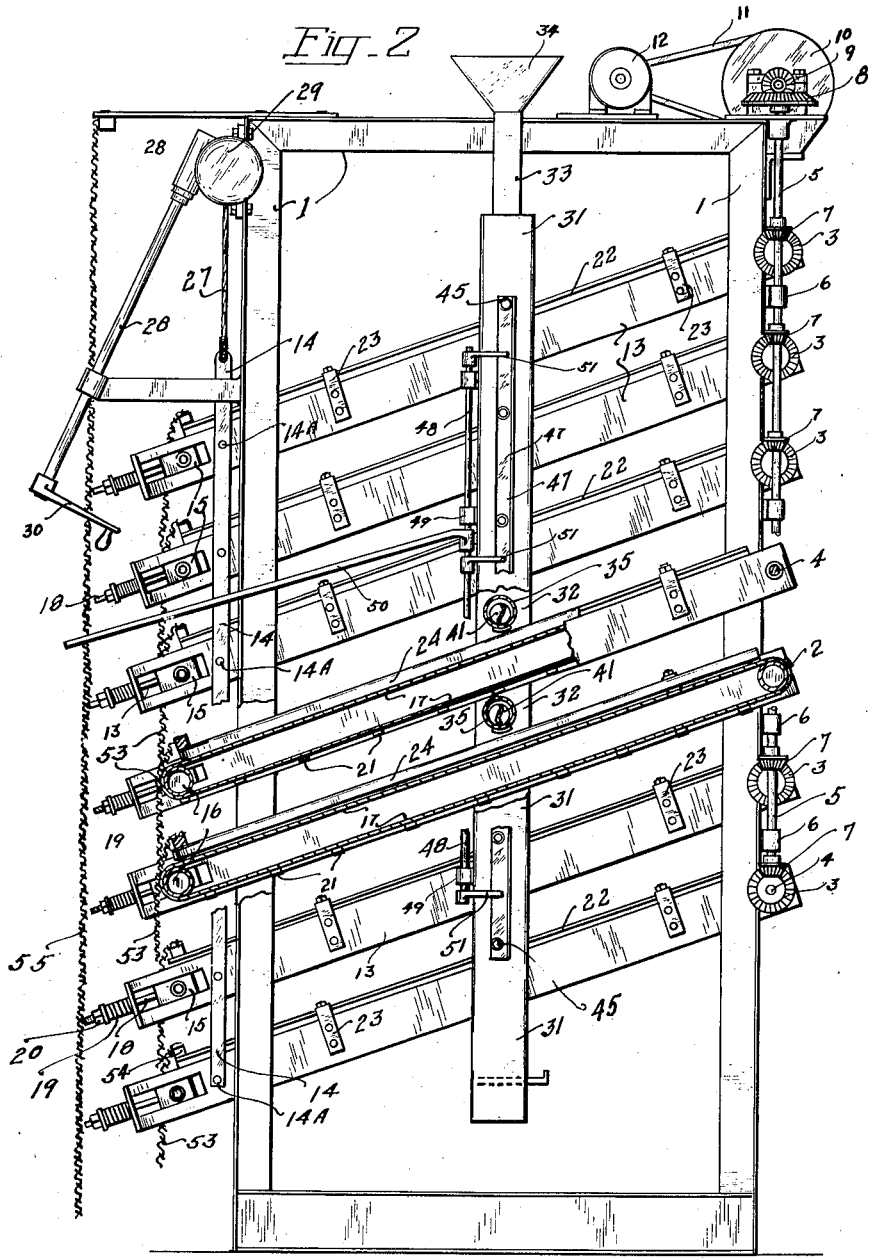

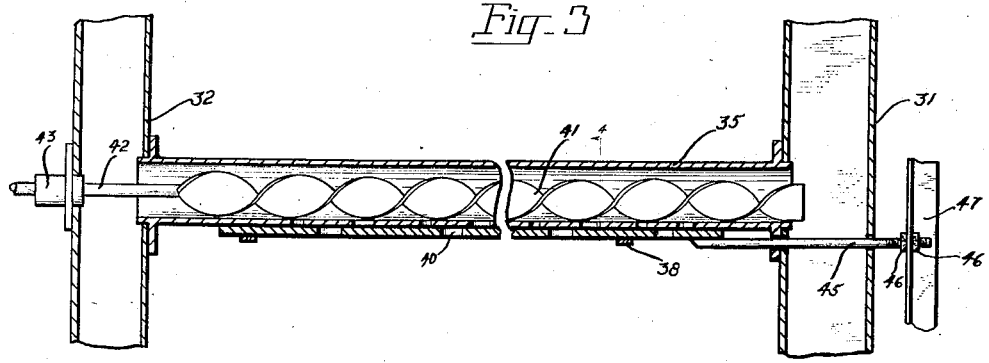
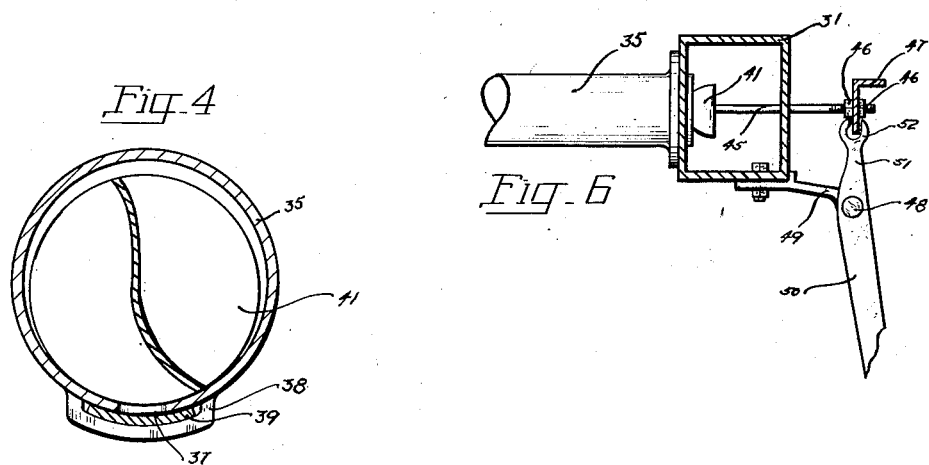
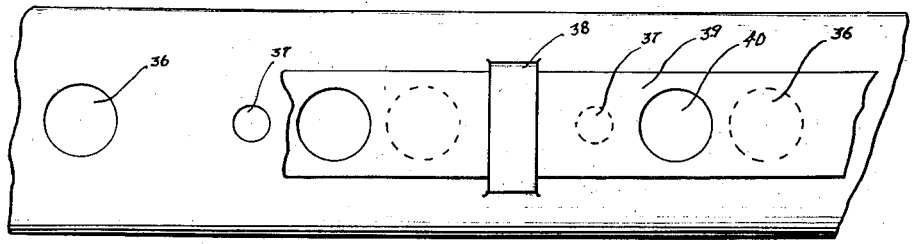

Patented Feb. 23, 1937

2,071,908

UNITED STATES PATENT OFFICE 2,071,908

GRAIN AND SEED SEPARATOR

William A. Van Dyke, Forest Grove, Oreg.

Application July 22, 1935, Serial No. 32,573

3 Claims. (Cl. 209—114)

My invention relates to improvements in grain and/or seed separators of the moving apron type, and an important object of the invention resides in improvements in the mounting and operating of such aprons, essentially to the means for controlling the inclination thereof.

Another object of the invention is to provide an improved means for delivering and spreading grains and/or seeds evenly over the upper run of the aprons in order to bring about an even separation over the face of the apron thereby avoiding the danger of a partial separation of the products.

Another object of the invention resides in the preliminary handling of the mixed grains and/or seeds as such products are carried to the distributing or spreading means. In this connection the invention embodies construction preventing clogging of the distributing or spreading means and operating to return to the point of origin products in excess of the amount the spreading means is capable of handling.

Another object of the invention is to construct the distributing or spreading means so that the amount of products delivered thereby to the aprons may at all times be regulated, the amounts thereof be increased or decreased; as well as to control the aforesaid means to accommodate it to large or small products.

Another object of the invention is to construct the distributing means in a manner that, while it will compel products to travel to the distribution or spreading points, it will not destroy or crush such products.

Another object of the invention is to provide a means for cleaning the aprons which will not interfere with the operation of the invention.

These and other objects of the invention will be understood upon reading the specification following aided by the accompanying drawings, wherein Figure 1 is an end elevation of a separating machine. This view illustrates the means for increasing or decreasing the inclination of the aprons, a distributing member, with parts broken away, for distributing products over the upper run of the aprons. This view also illustrates the hanging of the drapers employed for cleaning the aprons.

Figure 2 is a side elevation, with parts broken away and in section, illustrating the small drapers. This figure also illustrates the conveying means for conveying products to the upper run of the aprons; also the mechanism for controlling the distribution and spreading of products on the aprons.

Figure 3 is a side sectional elevation of a portion of the products' conveying means, a products' distributing means, and the means for controlling the distribution of the products together with the overflow conveyor.

Figure 4 is a sectional view taken on the line 4—4 looking in the direction indicated.

Figure 5 is an inverted plan view of a portion of the products' distributing and spreading means.

Figure 6 is a fragmentary horizontal sectional view of the supply chute or conveyor leading to the products' distributing and spreading means, a portion thereof being shown together with the operating means for operating the elements controlling the distribution and spreading of products upon the aprons.

Figure 1:
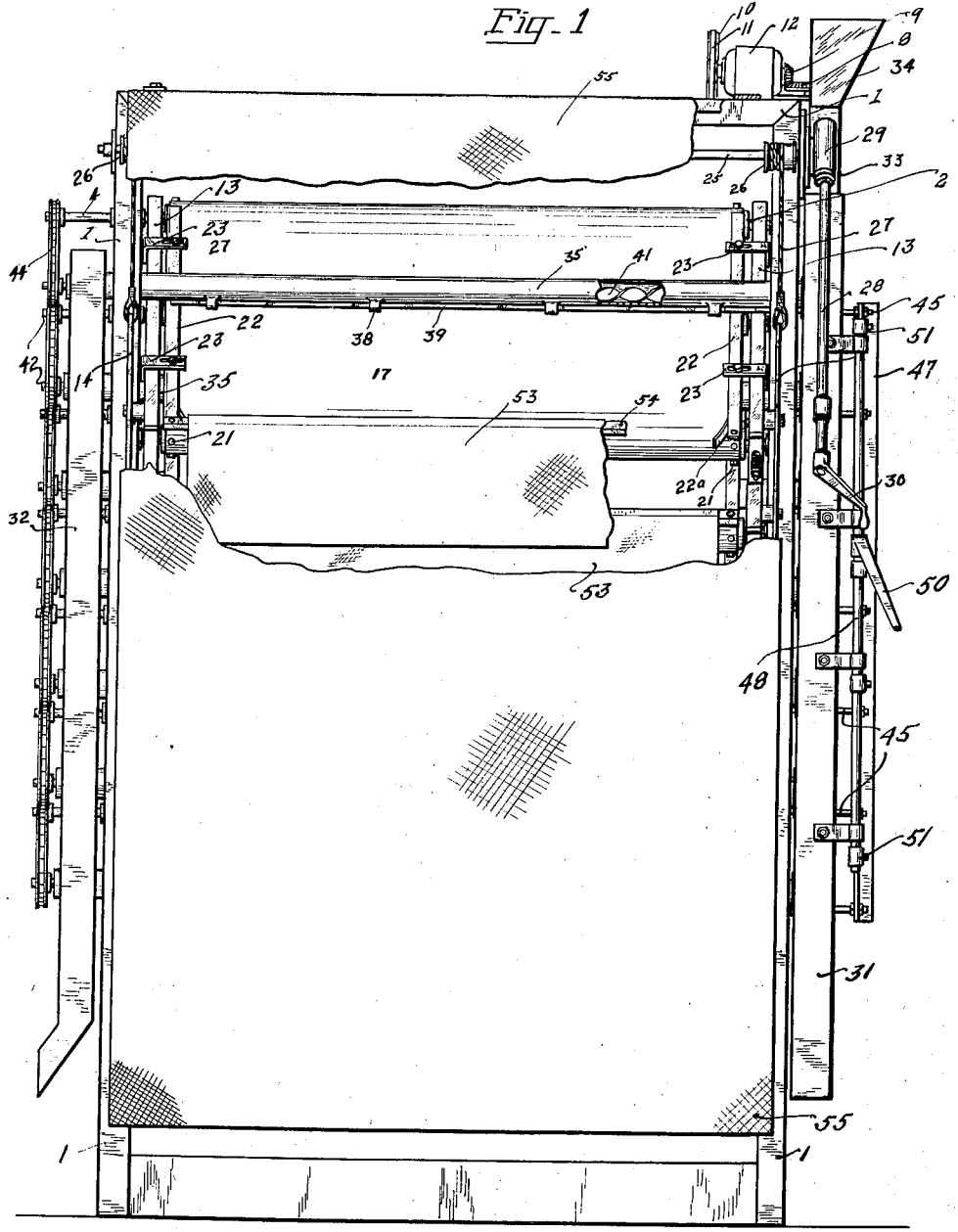

In the drawings, Figure 1 indicates a rectangular open work frame to which is mounted by means of suitable spindles and bearings the rolls 2, each of which is supplied with a bevel gear 3, the spindle or shaft for the roll being indicated by the numeral 4 at the bottom of the multiple mounting of the rolls in Figure 2. A vertical shaft 5 mounted in bearings 6 and supplied with bevel gears 7 meshing with gears 3 provide means for rotating the rolls 2 in unison. Meshing gears 8 and 9, pulley 10, belt 11 and motor 12 provide means for driving the shaft 5 when it is understood that gear 8 is mounted to the top thereof.

Mounted likewise to the spindles 4 are the frames or side members 13 by their one end while their opposite ends are pivotally secured to the supporting links 14 by means of the pins 14a. To the end of the side members 13 which are connected to the links 14 is slidably secured bearings 15 in which are mounted spindles at the ends of the rolls 16. Over the rolls 16 and 2 is trained an endless apron 17. In order to maintain the aprons in a taut condition, bearings 15 are supplied with a rod 18 which is constantly urged to the end of the side members 13 by means of the spring 19 bearing against the nut 20 threaded to such rod, the operation of which will be readily understood upon examining the construction in Figure 2. Along the lateral edges of the aprons and spaced from one another are the buttons 21, which ride in the angle guide 22, adjustably held between slotted supporting members 23 mounted to the side member 13. The guides 22 have down turned flanges 24 against which the buttons 21 engage as the apron 17 travels over rolls 2 and 16. This prevents lateral play or weaving of the belts while they are in motion.

To the upper end of the frame 1 is mounted a shaft 25, having rolls 26 approximate each end thereof and over each of which is trained cord or cable 27 which have their ends connected with the links 14. Likewise mounted to the frame in a diagonal manner to afford ease for manipulation of the shaft 28 connected by a suitable worm and worm wheel concealed in the casing 29, but well known to the art, to the shaft 25. Shaft 28 is provided with an operating handle 30 or crank. From the foregoing it will be seen that rotation of shaft 28 by means of crank 30 will rotate shaft 25 and hence rolls 26, which will cause the cords 27 to wind or unwind from such rolls, thus either raising or lowering the links 14 and consequently the attached ends of the side members 13. It will thus be seen upon the examination of Figure 2 that the raising or lowering of the ends of the side members 13 by the links 14 and other means just described will decrease or increase the inclination of the apron 17 as the case may be.

As indicated in the commencement hereof, this machine is intended to separate grains and seeds. For instance, it may be employed for separating sound and unsound beans; or for separating mixed grains and seeds as for instance peas and oats. In order to avoid too much detail, the description of the operation of the machine will be limited to the separating of oats and peas, though it is to be understood that the machine is not limited to those two products.

In operation the aprons 17 are caused to travel by the means heretofore described. The mixed oats and peas are spread upon the upper run of the apron. Owing to the inclination of the aprons, the peas will roll into the lower end of the apron where they will drop off and be collected by suitable means. However, the oat grains will not roll, but will have a tendency to cling to the apron and are carried to the upper end of the apron where they drop off into suitable collecting means. Hence, it will be seen that the peas are collected on one side of the machine while the oats are collected on the other, each separate from the other. In order that there may be a perfect separation of the two products, however, it is necessary that they be spread more or less evenly upon the upper run of the aprons. In this connection I have provided a new and improved means for spreading or conveying the mixed products to the upper run of the aprons, which will now be described. At one end of the machine is attached a supply chute 31 in a manner that it may be raised and lowered with the side member 13 while at the other end of the machine likewise connected to the side member 13 on that side of the machine is an overflow chute 32. Chute 31 telescopes about a stationary chute 33 which in turn is supplied by the hopper 34 into which the mixed products are fed. Extending between chutes 31 and 32 and over the upper run of each apron is a spreader or distributor member 35 which in this instance partakes the form of a tube or pipe, the under side of which is perforated by alternately large and small holes 36 and 37. Sliding in guides 38 is a gate member 39 provided with spaced openings 40. Member 39 is slidable back and forth in the guides to a position whereby the opening 40 may be in register with the opening 36 or 37, or out of register with either of the openings. The openings 36 and 37 are spaced over the upper run of the aprons 17, so it will be seen that if products are carried to the interior of the member 35 they will drop through one or the other of the openings 36 or 37 according to which one thereof the opening 40 has brought into register. As opening 40 registers with opening 37 the amount of products discharged upon the apron will be less than were the opening 40 to register with opening 36, which is larger than opening 37. Operating freely within the member 35 is a spiral screw conveyor 41 which has an end shaft 42 penetrating chute 32 and resting in bearing 43. The outer end of shaft 42 is provided with a sprocket, over which is trained a chain 44 trained over a sprocket upon a shaft 4. When shaft 4 is rotated, rotation is extended to shaft 42 and consequently to the conveyor 41, thus carrying products from the chute 31, into which the member 35 opens, through the member 35 to discharge through the openings 36 or 37 upon the apron 17. In the event that the rate of discharge of the products from the member 35 is less than the amount received from the chute 31, the excess amount is carried to chute 32 where it is taken care of by any suitable means, such as returning it to the hopper 34.

One end of the gate or blade 39 has a rod extension 45. All the rods 45 are adjustably connected by the nuts 46 threaded thereon to the angle member 47 so that when member 47 is moved to or from the chute 31, the gates 39 are operated in unison moving opening 40 of each gate into or out of register with the openings 36 and 37 in members 35. Means are provided for operating the bar or rod 47 consisting of a shaft 48 mounted in bearings 49 and operated by lever 50. Secured to the shaft 48 are a number of arms 51 which have a sliding yoke end 52 engaging each side of the member 47. When lever 50 is operated, shaft 48 is likewise rocked, causing the arms 51 to also rock in one direction or the other. This, by reason of the yoke 52 will cause the member 47 to move in one direction or another and cause the gates 39 to move in a like manner by reason of their connection thereto.

Experience has shown that in operation aprons of the general type of aprons 17 have a tendency to collect dust and particles of seeds and grains. This to a great extent hampers normal operation of such aprons. With the view of overcoming this objectional feature, I have provided means in the present invention for reducing the collection of dirt and particles by the aprons to a substantial extent. This cleaning means consists of a number of flexible curtains 53 extending from rods 54 mounted upon the guides 22. These curtains loosely engage the lower ends of the aprons 17 causing the matter collected thereon to drop off; at the same time the engagement does not prohibit seeds or grains from dropping over the lower end of such curtains. In connection with the curtains 53 I employ a large curtain 55 mounted from the top of the machine to the bottom thereof and covering the smaller curtains 53. The engagement of curtain 55 is not sufficient to prohibit the operation of separating the seeds or grain, but is sufficient to aid very materially in loosening and preventing the collection of dust and dirt upon the aprons 17.

The guide 22, an angle member, has its down turned flange portion 22a continued and turned inwardly toward the center of the apron 17. This construction allows the buttons 21 to readily enter the interior of the guide 22, at the same time the curved portion 22a prevents seeds or grains from entering within the guide and becoming clogged therein.

The screw conveyor 41 rests more or less freely within the member 35 providing a little play between it and the interior walls of such member 35. By disposing member 41 not entirely rigidly within member 35, the danger of cracking or breaking grains or seeds, which would occur were member 41 rigidly mounted, is entirely avoided.

In operation, as will be noted, the aprons 17 are operated in multiple, that is to say, one above the other. A separate distributing means or member 35 is provided over each apron. The products to be separated are placed in the hopper 34 traveling down the chute 31 through the members 35 and into such members by means of the screw conveyors 41, the surplus going to the chute 32. The large or small opening, 36 or 37, is opened as the case may require allowing products to fall on the upper run of the apron 17 where portions travel to the lower end and the remainder to the upper end as heretofore described. The inclination of the apron may be increased or decreased by manipulation of the crank 30, which through the medium of the shafts 28 and 25 and rolls 26 raises and lowers one end of such aprons.

While a specific form of the improvement has been described and illustrated herein, it is desired to be understood that the same may be varied within the scope of the appended claims, without departing from the spirit of the invention.

Having described my invention, I claim:—

1. In a separating machine of the class specified, an apron, a tubular member mounted thereabove, a supply chute connected at one open end thereof, an overflow chute connected at the other end thereof, a spiral conveyor operating therein, the bottom of said tubular member being provided with a number of large and small alternating apertures, and a slide in conjunction with said tubular member provided with apertures slidable into register with the large or small apertures in the tubular member.

2. In a separating machine of the class described, a plurality of superposed aprons, means for increasing and decreasing the inclination thereof, means for spreading products to be separated over the upper run of each apron comprising a hollow member extending transversely of an apron and spaced thereabove, means for conducting products to one end thereof, means for conducting an overflow of products from the other end thereof, openings in the bottom thereof and alternate openings being larger than the remaining openings, a bar slidably mounted beneath the hollow member provided with openings registerable with the larger openings or the smaller openings in the hollow member and further movable to a position where the bar obstructs all openings, and means for operating all bars simultaneously.

3. In a separating machine of the class specified, a plurality of superposed aprons, a distributing member above each apron having perforations for the passage of products to the upper run of the apron, means for conducting products through said member from end to end and to the perforations and means for uncovering and covering the perforations comprising a gate in slidable association with said member, said gate having projecting rods, a member connected to all said rods, a shaft, a lever for operating said shaft, and arms mounted to said shaft and provided with yokes engaging the last mentioned member whereby when said shaft is rocked, said yokes carry said member back and forth.

WILLIAM A. VAN DYKE.